US 7,132,061 B2

(12) United States Patent
Yoshimura

(10) Patent No.: US 7,132,061 B2
(45) Date of Patent: Nov. 7, 2006

(54) ELECTROCONDUCTIVE SILICON NITRIDE BASED COMPOSITE SINTERED BODY AND METHOD FOR PREPARATION THEREOF

(75) Inventor: Masashi Yoshimura, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 192 days.

(21) Appl. No.: 10/466,838

(22) PCT Filed: Jan. 17, 2002

(86) PCT No.: PCT/JP02/00298

§ 371 (c)(1),
(2), (4) Date: Jul. 22, 2003

(87) PCT Pub. No.: WO02/057197

PCT Pub. Date: Jul. 25, 2002

(65) Prior Publication Data

US 2004/0046153 A1    Mar. 11, 2004

(30) Foreign Application Priority Data

Jan. 22, 2001 (JP) ............... 2001-012875

(51) Int. Cl.
*C04B 35/58* (2006.01)
*B29C 67/00* (2006.01)
*H05B 6/00* (2006.01)

(52) U.S. Cl. ............. 252/500; 252/518.1; 252/519.1; 501/92; 501/96.5; 501/97.4; 501/98.1; 264/404; 264/668

(58) Field of Classification Search ............... 252/500, 252/518, 519, 520, 518.1, 519.1; 264/327, 264/405, 472, 668, 404; 501/96, 97, 98, 501/92, 97.4, 98.1, 96.5
See application file for complete search history.

(56) References Cited

U.S. PATENT DOCUMENTS 4,659,508 A     4/1987   Higuchi et al.
5,369,065 A  *  11/1994  Yoshimura et al. ........ 501/97.4

FOREIGN PATENT DOCUMENTS

JP     57-200265 A    12/1982
JP     58-020782 A    2/1983
JP     59-207880 A    11/1984

(Continued)

OTHER PUBLICATIONS

Yoshimura et al, "Microstructure and Tribological Properties of Nano-Sized Si3N4," Scripta Mater, 2001(44), pp. 1517-1521, May 18, 2001.*

(Continued)

*Primary Examiner*—Douglas McGinty
*Assistant Examiner*—Kallambella Vijayakumar
(74) *Attorney, Agent, or Firm*—McDermott Will & Emery LLP

(57) ABSTRACT

A conductive silicon nitride composite sintered body having an average grain size of 100 nm or less and whose relative roughness (Ra) after electric discharge machining is 0.3 μm or less can be obtained by grinding/mixing a silicon nitride powder and a metal powder together until the average particle size of the silicon nitride powder becomes 30 nm or less, and subsequently by molding and sintering. It is preferable that the crushing/mixing is continued until it is apparent that a peak of added metal in an X-ray diffraction pattern has disappeared during the crushing/mixing.

10 Claims, 1 Drawing Sheet

FOREIGN PATENT DOCUMENTS

| | | | |
|---|---|---|---|
| JP | 07-133157 A | | 5/1995 |
| JP | 10-338576 A | | 12/1998 |
| JP | 10338576 | | 12/1998 |
| JP | 11-139874 | * | 5/1999 |
| JP | 11-139874 A | | 5/1999 |
| JP | 11-139877 | * | 5/1999 |
| JP | 11-139877 A | | 5/1999 |
| JP | 11-139882 A | | 5/1999 |
| JP | 11139882 | | 5/1999 |
| JP | 2000-154064 | * | 6/2000 |
| JP | 2000154064 | | 6/2000 |
| JP | P2000-154064 A | | 6/2000 |

OTHER PUBLICATIONS

"X-ray Structural analysis" by Waseda and Matsubara, pp. 119-126, Apr. 10, 1998, published by Uchida Rohkakuho (cited in specification).

"Yoshimura M et al": Microstructure and tribological properties of nano-sized Si3N4, Scripta Materialia, Elsevier, NY, NY, US, vol. 44, No. 8-9, May 18, 2001, pp. 1517-1521, XP004327598.

"Yoshimura M et al": Synthesis and Functionality of Nanostructured Si3N4 by Novel Process, Materials Integration, TI Ai Shi, Kyoto, JP, vol. 14, No. 1, 2001, pp. 35-39, XP009030521.

* cited by examiner

ELECTROCONDUCTIVE SILICON NITRIDE BASED COMPOSITE SINTERED BODY AND METHOD FOR PREPARATION THEREOF

TECHNICAL FIELD

The present invention relates to a silicon nitride composite sintered body having electric conductivity and which is useful as various structural parts and wear resistance parts such as cutting tools and sliding parts.

BACKGROUND ART

Silicon nitride has been widely used for various structural parts such as vehicle engine parts, cutting tools, and abrasion resistance materials such as roller bearings, and the like, since it is excellent in hardness, mechanical strength, and thermal resistance, and also chemically stable. Recently, in all of these fields, not only have the levels of performance required of materials become extremely high but also the degrees of processing accuracy required of those materials have become strict. As a result, when these materials are used for products, the costs of the products become higher as the costs of processing are higher, which has been the greatest factor in preventing expansion of the markets.

Thus, various processing methods have been proposed. Among them, the most frequently used method is a technique of electric discharge machining that is performed in a state wherein electric conductivity is afforded to a silicon nitride composite sintered body by dispersing conductive particles into a matrix composed of silicon nitride and grain boundary phase.

For example, in Ceramics 21: pp 719–725 (1986), it is described that electric discharge machining is made possible by dispersing conductive particles of from 20 to 40% by volume into $Si_3N_4$ to make a silicon nitride material with electric conductivity. However, the surface roughness of such silicon nitride materials deteriorates after the electric discharge machining, and surface cracks occur which are attributed to thermal shock and electric discharge at the electric discharge machining. Thus, the resultant materials cannot be used for practical application because of their low mechanical properties unless grinding or polishing is carried out to remove their surface cracks after the electric discharge machining.

DISCLOSURE OF INVENTION

The present invention was derived to solve the above problems. That is, the present invention provides a conductive silicon nitride composite sintered body capable of surface smoothing after the electric discharge machining, which is excellent in mechanical properties, and a process for the production thereof.

The conductive silicon nitride composite sintered body of the present invention, which is composed mainly of silicon nitride and metal nitride each having an average grain size of 100 nm or less, wherein the metal nitride is contained at 25% to 60% by volume, is characterized in that there exists a region where the area ratio of the metal nitride is within a 2/3 power ratio of volume % of the metal nitride±10% at a region of 2 μm wide and 2 μm long in an arbitrarily selected section of the sintered body. The area ratio herein is a percentage of an area excluding the vacancies. The surface roughness (Ra) of the discharged surface is 0.3 μm or less after the electric discharge machining. The metal of the metal nitride is at least one kind of element selected from Groups IVa, Va and VIa, and more preferably is Ti or Ta.

The sintered body of the present invention is obtained by a manufacturing process comprising a step of preparing a silicon nitride powder, a powder of sintering aids, and a metal powder, a step of grinding/mixing these powders until the silicon nitride powder of which the average particle size is 30 nm or less is obtained to make a mixed powder, a step of molding the mixed powder to make a molded body, and a step of sintering the molded body in a non-oxidative atmosphere to make a sintered body. It is desirable to grind and mix until an X-ray diffraction peak of the metal in the powder apparently disappears in the step of grinding/mixing. The metal is at least one kind of element from Groups IVa, Va and VIa, and is preferably Ti or Ta.

BEST MODE FOR CARRYING OUT THE INVENTION

Figure 1:
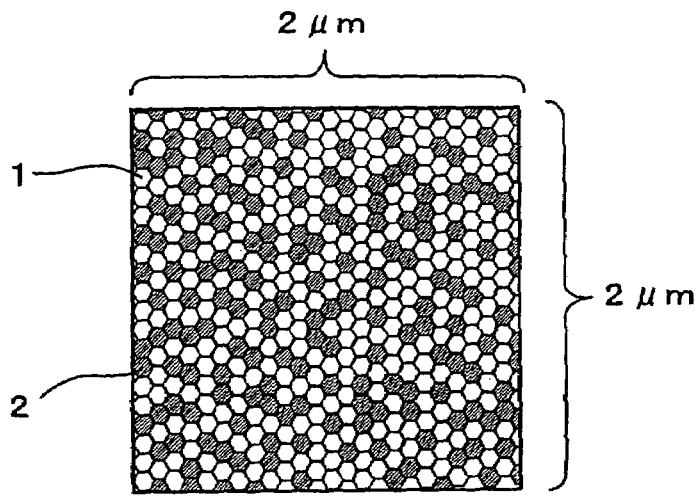
FIG. 1 is a schematic illustration showing a sectional contexture of the silicon nitride composite sintered body of the present invention wherein the area ratio of TiN is within a 2/3 power ratio of volume % of TiN±10% at a region of 2 μm wide and 2 μm long (white portion 1 is $Si_3N_4$, and black portion is TiN).

The composite sintered body of the present invention is described in detail below including the process for the production thereof. "Silicon nitride" in the present invention indicates silicon nitride ($Si_3N_4$) and/or ceramics containing sialon as a major crystal phase and includes oxynitriding silicon and the like. Also, "metal nitride" includes those mixed in with oxygen. Further, "silicon nitride composite sintered body" indicates materials wherein a different component is dispersed and compounded in the matrix composed mainly of such ceramics as the major crystal phase.

Each average grain size of the silicon nitride particles and the dispersed particles composed mainly of the metal nitride in the composite sintered body of the present invention is 100 nm or less. In the case of utilizing the composite sintered body with a larger average grain size than this, the relative surface roughness becomes worse after the electric discharge machining because the materials are not effectively eliminated at the electric discharge machining.

Electric conductivity is required to enable electric discharge machining. Therefore, it is necessary to disperse conductive particles in a material uniformly so as to be contained therein in network form on the order of a nanometer. The preferable added amount of the metal nitride which is in the form of dispersed particles is 25% by volume or more and 60% by volume or less. When it is less than 25% by volume, the metal nitride network is not dispersed uniformly, so it is difficult to obtain the electric conductivity required for the electric discharge machining. On the other hand, when it is more than 60% by volume, particle growth readily occurs because the dispersed particles tend to combine with one another during sintering, which results in deterioration of the mechanical properties.

There exists a region where an area ratio of the metal nitride is within a 2/3 power ratio of volume % of the metal nitride±10% at a region of 2 μm wide and 2 μm long in an arbitrarily selected section of the sintered body. The relative surface roughness deteriorates after the electric discharge machining because the contexture of such materials of the sintered body that are not within the range are ununiform.

Electric discharge machining becomes possible from 5% to 60% by volume of the conductive dispersed particles by dispersing the metal nitride such that there exists a region where the area ratio of the metal nitride is within a 2/3 power ratio of volume % of the metal nitride±10% at a region of 10 μm wide and 10 μm long in an arbitrarily selected section of the sintered body and where the area ratio of the metal nitride is not within a 2/3 power ratio of volume % of the metal nitride±10% at an arbitrarily selected region of 2 μm wide and 2 μm long. A material dispersing the metal nitride uniformly within the range has a surface relative roughness (Ra) of 0.3 μm or less at the discharged surface after the electric discharge machining. The silicon nitride composite sintered body that has a discharged surface whose relative roughness (Ra) is 0.3 μm or less is a material having a smooth discharged surface and excellent mechanical properties after the electric discharge machining.

The nitride that is to be dispersed particles may be the nitride of a transition metal with electric conductivity. However, in order to sufficiently achieve the target effect of the present invention, preferable is the nitride of an element from Group IVa (Ti, Zr, or Hf), Group Va (V, Nb, or Ta) and Group VIa (Cr, Mo, or W) of the Periodic Table. Among them, particularly the nitride of Ti or Ta is more preferable.

Some amounts of carbon and oxygen may be contained in the metal nitride in the form of dispersed particles. For example, the form in which nitrogen is partially compounded with carbon and/or oxygen is allowed, and carbon and/or oxygen may exist alone. Also, the nitrides containing multiple metal elements (composite nitride) may co-exist. In order to make the multiple nitrides of metal elements thus co-exist, powders of multiple metals are previously mixed. Or they may be added in a form of compound of metals or a composite nitride. Added particles of different metal elements are dispersed from one another by adding in a form containing two or more kinds of metal elements in this way. Since particle growth is inhibited by one another as a result of such dispersion, the dispersed average particle size of the dispersed particles becomes smaller than that in the case of containing one type. This results in further improvement of the relative surface roughness of the discharged surface.

The material of the present invention is obtained by the process comprising a step of preparing a silicon nitride powder, a metal powder and a powder of sintering aids, a step of grinding/mixing these powders until the average particle size of the silicon nitride powder becomes 30 nm or less so as to make a mixed powder, a step of molding the mixed powder to make a molded body, and a step of sintering the molded body in a non-oxidative atmosphere to make a sintered body. The sintering in the non-oxidative atmosphere is preferably performed at a temperature range from 1100° C. to 1500° C. It is preferable that the crushing/mixing is continued until it is apparent that a peak of added metal in an X-ray diffraction pattern has disappeared during crushing/mixing.

The raw material powders may be any of those commercially available. The crystal type of $Si_3N_4$ may be either α or β type. And either imide decomposed powder or directly nitrided powder may be used. Both $Si_3N_4$ powder and powder of the sintering aids preferably have an average particle size of 5 μm or less, and more preferably 2 μm or less, since the smaller the average particle size, the more desirable in terms of ease of particle size control and improvement in the mechanical properties. The smaller the average particle size of the metal powder added for the dispersed particles, the more desirable it is, and it is preferably about 10 μm or less and more preferably 5 μm or less.

Grinding and mixing are carried out such that the average particle size of silicon nitride powder in the grinded/mixed mix powder is 30 nm or less. If the average particle size of silicon nitride powder is more than 30 nm, it is difficult to control the average particle size of the silicon nitride particles and the metal nitride particles to be 100 nm or less and the contexture of the sintered body become uniform. As a result, the relative surface roughness deteriorates after the electric discharge machining. It is desirable that mixing is carried out by a method with grinding means such as a ball mill or attritor. For example, as described in Japanese Laid-Open Patent No. 338576/1998, mechanical alloying is carried out using such a mixing apparatus. According to this means, a fine mixed powder with an average particle size of 30 nm or less is obtained by plastic deformation ability of the metal powder that is added as the source of particles to be dispersed as mentioned above. Conditions such as grinding acceleration, charging amount ratio between a powder and a powder grinding medium, grinding time period and the like are appropriately selected according to the level of the average particle size of the initial raw material powder.

A $Si_3N_4$ powder, a powder of sintering aids and a metal powder to become dispersed particles may be extremely fine particles obtained beforehand by chemical or physical means from metals and organic/inorganic salts. Such means include, for example, a method in which co-precipitates are obtained from organic salts of metals, a method in which particles are produced by heat treatment from an inorganic composite compound such as Si—Ti—N, and the like. Also, the grinding means includes a vibration grinding method and the like in addition to the above.

We investigated in detail the relationship between the X-ray diffraction pattern of the mixed powder during the crushing/mixing. As a result, an X-ray diffraction peak of added metal in the X-ray diffraction pattern of the mixed powder deteriorates during the mixing and apparently disappears after a certain duration of mixing. We discovered that the contexture of a sintered body of the mixed powder of which an X-ray diffraction peak of added metal disappeared apparently showed a region where the area ratio of the metal nitride was within a 2/3 power ratio of volume % of the metal nitride±10% at a region of 2 μm wide and 2 μm long in an arbitrarily selected section and the metal nitride was dispersed evenly. It is considered that the silicon nitride powder is dispersed in the metal during mixing and the metal is converted to nitride. A fine structure of the silicon nitride and even dispersion of the metal nitride is then obtained.

The molding methods known in the art such as a common dry press molding method, an extrusion molding method, a doctor blade molding method, and an injection molding method can be used for the mixed powder prepared in the above manner. The most preferable molding method can be selected for quality and production in accordance with the desired shape. The bulk density can be also previously increased to enhance moldability by granulating a mixed powder into granules prior to the molding after the grinding and mixing.

It is preferable that the molded body is sintered at a temperature range from 1100° C. to 1500° C. in a non-oxidative atmosphere. With such a temperature range the relative density of the sintered body becomes 95% or more, which results in the stable mechanical strength thereof being readily obtained after electric discharge machining. The heating means of sintering may be a common sintering at normal pressure, but are preferably the means such as a pulse electric discharge sintering method and a sintering method by high-frequency induction heating in which the temperature of the molded body can be raised in a short time and the molded body can be uniformly heated. The sintering may be carried out under a pressure applied with an ambient gas or applied mechanically from outside. When the sintering temperature is 1100° C. or less, the molded body is not sintered sufficiently. When it is more than 1500° C., grain growth becomes remarkable and thus it becomes difficult to obtain the composite sintered body of the present invention.

EXAMPLE 1

An α type silicon nitride powder with an average particle size of 0.8 μm and a metal Ti powder with an average particle size of 10 μm, as well as sintering aids $Y_2O_3$ of 2.5% by weight and $Al_2O_3$ of 1% by weight, respectively relative to the weight of silicon nitride were prepared. All of the powders are commercially available. The amount of Ti shown in Table I was prepared, and subsequently, mixing was carried out for the time period shown in Table I using a planetary ball mill having an acceleration of 150 G. The amount of the metal Ti to be added herein is an amount calculated on the assumption that the whole Ti would be converted into metal nitride. The presence or absence of the metallic peak was determined by X-ray diffraction for the resultant powder. The average particle size was calculated from the X-ray diffraction data of the sample using Hall's formula described in Waseda and Matsubara, "X-ray Structural analysis" page 119–126 (Apr. 10, 1998, published by Uchida Rohkakuho). The results are shown in Table I.

TABLE I

| | Ti added Amount (Amount converted as TiN) | Mixing time period (Hr) | Presence or absence of metallic Ti peak | Particle size of $Si_3N_4$ (nm) |
|---|---|---|---|---|
| 1-1* | 25 | 2 | Yes | 100 |
| 1-2* | 25 | 8 | Yes | 30 |
| 1-3 | 25 | 16 | No | 25 |
| 1-4 | 25 | 24 | No | 16 |
| 1-5* | 40 | 8 | Yes | 50 |
| 1-6 | 40 | 24 | No | 12 |
| 1-7* | 50 | 8 | Yes | 30 |
| 1-8 | 50 | 24 | No | 10 |
| 1-9 | 60 | 16 | No | 30 |
| 1-10* | 70 | 24 | No | 12 |
| 1-11* | 20 | 24 | No | 20 |

Asterisk (*) indicates Comparative Example

The produced mixed powder was pressurized and sintered by a pulse electric heating method with a pressure of 30 MPa in a nitrogen atmosphere under conditions shown in Table II. Specular surface processing was provided onto the surface of the resultant sintered body. Subsequently, the image of the polished surface of the sample was taken by electron microscopy at a magnification of 50,000. The average grain sizes of $Si_3N_4$ particles and the dispersed particles (TiN) were confirmed by statistically analyzing the image in a given visual field using the segment division method.

TABLE II

| | Sintering temperature (° C.) | Relative density (%) | Grain size of $Si_8N_4$ (nm) | Grain size of TiN (nm) | Electric conductivity | Relative roughness of discharged surface (μm) | Fracture strength (MPa) | Area ratio of TiN |
|---|---|---|---|---|---|---|---|---|
| 1-1* | 1300 | 98 | 300 | 1000 | ○ | 2.0 | 200 | x |
| 1-2* | 1300 | 99 | 80 | 600 | ○ | 1.5 | 320 | x |
| 1-3 | 1100 | 98 | 60 | 50 | ○ | 0.3 | 900 | ○ |
| 1-3 | 1300 | 99 | 65 | 70 | ○ | 0.2 | 1050 | ○ |
| 1-4 | 1100 | 98 | 60 | 50 | ○ | 0.15 | 1200 | ○ |
| 1-4 | 1500 | 99 | 80 | 80 | ○ | 0.2 | 1060 | ○ |
| 1-4* | 1600 | 99.5 | 120 | 150 | ○ | 0.5 | 540 | ○ |
| 1-5* | 1100 | 98 | 60 | 50 | ○ | 0.6 | 600 | x |
| 1-6 | 1100 | 98 | 60 | 50 | ○ | 0.15 | 1250 | ○ |
| 1-7* | 1100 | 98 | 60 | 70 | ○ | 0.8 | 360 | x |
| 1-8 | 1100 | 99 | 50 | 50 | ○ | 0.2 | 850 | ○ |
| 1-9 | 1100 | 99 | 50 | 60 | ○ | 0.13 | 800 | ○ |
| 1-10* | 1100 | 99 | 50 | 70 | ○ | 0.1 | 330 | ○ |
| 1-11* | 1300 | 98.5 | 60 | 60 | x | Impossible to machine | — | ○ |

Asterisk(*) indicates Comparative Examples

Further, the results of the properties examined as described below are shown in Table II. The electric conductivity was represented by a circle in a case where the electric resistance capable of performing the electric discharge is $10^0$ Ω·cm or less when measured by a four-point electric resistance measuring instrument, and by a cross when it is more than $10^0$ Ω·cm. Further, the samples were cut using an electric discharge machine (Sodick AP450), and the relative roughness (Ra) of the discharged surface was determined by a contact type surface roughness meter. Also, the samples were finished to the shape of a strength test piece defined in JIS R1601, and the three-point flexural strength was determined according to the definition of the JIS standard. The surface that was subject to tensile stress during the strength test had been left in the same state as it was subjected to electric discharged machining. The images of the polished surfaces of the samples were taken by a 5,000 magnification electron microscope. Subsequently, an area ratio of TiN particles was calculated at a region of 2 μm wide and 2 μm long, which were taken arbitrarily. The samples in which the area ratio is within a 2/3 power ratio of volume % of TiN±10% were represented by circles, and those otherwise were represented by crosses.

Figure 2:
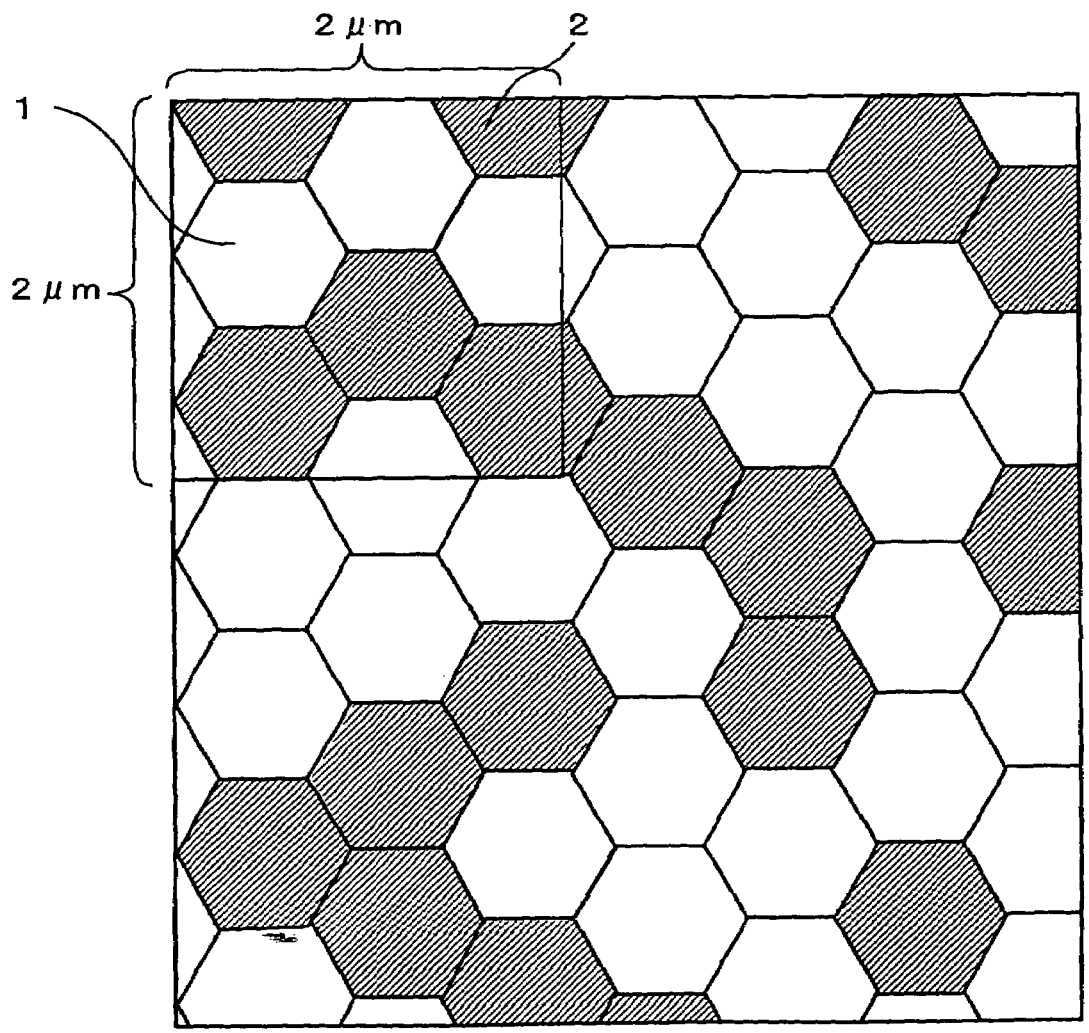
FIG. 2 is a schematic illustration showing a sectional contexture of the silicon nitride composite sintered body wherein the area ratio of TiN is not within a 2/3 power ratio of volume % of TiN±10% at a region of 2 μm wide and 2 μm long and within a 2/3 power ratio of volume % of TiN±10% at a whole region (white portion 1 is $Si_3N_4$, and black portion 2 is TiN).

FIG. 1 shows a schematic illustration of a sectional contexture of a sample in which the area ratio of TiN particles is within a 2/3 power ratio of volume % of TiN±10% at a region of 2 μm wide and 2 μm long. In the figure, a white part 1 and a black part 2 indicate $Si_3N_4$ and TiN, respectively. FIG. 2 shows a schematic illustration of a sectional contexture of a sample in which the area ratio of TiN particles is not within a 2/3 power ratio of volume % of TiN±10% at a region of 2 μm wide and 2 μm long. It is shown that the area ratio of TiN particles is within a 2/3 power ratio of volume % of TiN±10% in the entire FIG. 2, whereas it is not within a 2/3 power ratio of volume % of TiN±10% at an arbitrarily selected region of 2 μm wide and 2 μm long as shown in the figure.

As can be seen in Tables I and II, the sintered body of which the average grain size is at most 100 nm was obtained when crushing/mixing is continued until a peak of metal Ti in an X-ray diffraction pattern disappears. The relative density in the sintered body of the present invention is 95% or more, and the metal nitride (TiN) is dispersed unevenly. Also, the relative roughness (Ra) of the discharged surface after electric discharge machining is 0.3 μm or less, and the fracture strength is as high as 800 MPa or more.

INDUSTRIAL APPLICABILITY

According to the present invention, electric discharge machining is made possible by dispersing fine particles composed mainly of metal nitride into the fine matrix composed mainly of $Si_3N_4$, and smoothing of the discharged surface after electric discharge machining is possible. Thus, even with such electric discharge machining, a less expensive conductive silicon nitride composite sintered body which is excellent in mechanical properties can be provided.

What is claimed is:

1. A conductive silicon nitride composite sintered body comprising
    silicon nitride and metal nitride as its main components,
    said components each having an average grain size of 100 nm or less,
    said sintered body including the metal nitride of 25% to 60% by volume,
    said sintered body including, in an arbitrarily selected section thereof, a region where the area ratio of the metal nitride is within a 2/3 power ratio of volume % of the metal nitride ±10% at a region of 2 μm wide and 2 μm long.

2. A conductive silicon nitride composite sintered body comprising
    silicon nitride and metal nitride as its main components,
    said components each having an average grain size of 100 nm or less,
    said sintered body including the metal nitride of 25% to 60% by volume,
    a discharged surface of said sintered body having the relative roughness (Ra) of 0.3 μm or less after electric discharge machining.

3. A conductive silicon nitride composite sintered body according to claim 1, wherein a metal of said metal nitride is at least one kind of element selected from Groups IVa, Va and VIa of the Periodic Table.

4. A conductive silicon nitride composite sintered body according to claim 2, wherein a metal of said metal nitride is at least one kind of element selected from Groups IVa, Va and VIa of the Periodic Table.

5. A conductive silicon nitride composite sintered body according to claim 3, wherein the metal of said metal nitride is Ti or Ta.

6. A conductive silicon nitride composite sintered body according to claim 4, wherein the metal of said metal nitride is Ti or Ta.

7. A process for producing a conductive silicon nitride composite sintered body, comprising the steps of:
    preparing a silicon nitride powder, a powder of sintering aids and a metal powder;
    grinding/mixing these powders by mixing for 24 hours using a planetary ball mill having an acceleration of 150 G, until the average particle size of the silicon nitride powder becomes 30 nm or less so as to obtain a mixed powder;
    molding the mixed powder to make a molded body; and
    sintering the molded body in a non-oxidative atmosphere at a sintering temperature of 1,100° C. to 1,300° C. to make a sintered body.

8. A process for producing a conductive silicon nitride composite sintered body according to claim 7, wherein said crushing/mixing is continued until a peak of added metal in an X-ray diffraction pattern disappears.

9. A process for producing a conductive silicon nitride composite sintered body according to claim 7, wherein said metal is at least one kind of element selected from Groups IVa, Va and VIa.

10. A process for producing a conductive silicon nitride composite sintered body according to claim 9, wherein said metal is Ti or Ta.

* * * * *